US007829846B2

(12) United States Patent
Hashimoto et al.

(10) Patent No.: US 7,829,846 B2
(45) Date of Patent: Nov. 9, 2010

(54) ANALYTICAL SYSTEM AND METHOD UTILIZING THE DEPENDENCE OF SIGNAL INTENSITY ON MATRIX COMPONENT CONCENTRATION

(75) Inventors: Yuichiro Hashimoto, Tachikawa (JP); Hideki Hasegawa, Tachikawa (JP); Masuyuki Sugiyama, Hachioji (JP); Yasuaki Takada, Kiyose (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 12/037,148

(22) Filed: Feb. 26, 2008

(65) Prior Publication Data

US 2009/0065688 A1 Mar. 12, 2009

(30) Foreign Application Priority Data

Sep. 6, 2007 (JP) ............................ 2007-230903

(51) Int. Cl.
*H01J 49/40* (2006.01)
*G06F 19/00* (2006.01)
*G01N 31/00* (2006.01)

(52) U.S. Cl. ....................... 250/288; 250/281; 250/282; 250/284; 250/287

(58) Field of Classification Search ....................... None
See application file for complete search history.

(56) References Cited

U.S. PATENT DOCUMENTS

| | | | | |
|---|---|---|---|---|
| 5,037,764 | A * | 8/1991 | Wilk et al. | 436/518 |
| 5,481,476 | A * | 1/1996 | Windig | 702/31 |
| 5,498,545 | A * | 3/1996 | Vestal | 436/47 |
| 5,572,025 | A * | 11/1996 | Cotter et al. | 250/292 |
| 5,572,125 | A * | 11/1996 | Dunkel | 324/307 |
| 5,644,503 | A * | 7/1997 | Ito et al. | 702/22 |
| 5,726,064 | A * | 3/1998 | Robinson et al. | 436/514 |
| 6,393,368 | B1 * | 5/2002 | Ito et al. | 702/22 |
| 6,449,584 | B1 * | 9/2002 | Bertrand et al. | 702/180 |
| 6,539,102 | B1 * | 3/2003 | Anderson et al. | 382/128 |

(Continued)

OTHER PUBLICATIONS

Xu et al., "Comparison of conventional and enhanced mass resolution triple-quadrupole mass spectrometers for discovery bioanalytical applications", Rapid Communications in Mass Spectrometry, 17,832, 2003.

(Continued)

*Primary Examiner*—David A Vanore
(74) *Attorney, Agent, or Firm*—Antonelli, Terry, Stout & Kraus, LLP.

(57) ABSTRACT

The present invention achieves accurate quantitative determination without reducing measurement throughput and also without having to add a multi-component reference standard. An analytical instrument of the present invention for determining the concentration of a target compound contained in a target sample includes: a means for ionizing a mixture having a specific compound added to the target sample; a means for performing mass analysis on resulting ions; and a database that stores dependence of signal intensity on the concentration of a specific matrix component for each of the target compound and the addition compound, wherein the database is used to calibrate the concentration of the target compound from a signal derived from the target compound and a signal derived from the addition compound, each signal obtained by the mass analysis means. The present invention achieves a multi-component analyzer using low-cost, high-throughput mass analysis, as compared to conventional technique.

17 Claims, 5 Drawing Sheets

U.S. PATENT DOCUMENTS

| | | | | |
|---|---|---|---|---|
| 6,545,268 | B1 * | 4/2003 | Verentchikov et al. | 250/287 |
| 6,580,067 | B1 | 6/2003 | Yamada et al. | |
| 6,632,655 | B1 * | 10/2003 | Mehta et al. | 506/14 |
| 6,707,035 | B2 * | 3/2004 | Hughey et al. | 250/288 |
| 6,867,415 | B2 * | 3/2005 | Hughey et al. | 250/288 |
| 6,930,305 | B2 * | 8/2005 | Covey et al. | 250/288 |
| 6,940,065 | B2 * | 9/2005 | Graber et al. | 250/282 |
| 7,038,197 | B2 * | 5/2006 | Bateman et al. | 250/281 |
| 7,075,064 | B2 * | 7/2006 | Oliphant et al. | 250/281 |
| 7,110,886 | B2 * | 9/2006 | Ito et al. | 702/22 |
| 7,138,625 | B2 * | 11/2006 | Overney et al. | 250/288 |
| 7,232,689 | B2 * | 6/2007 | Pawliszyn | 436/178 |
| 7,279,679 | B2 * | 10/2007 | Old et al. | 250/282 |
| 7,356,446 | B2 * | 4/2008 | Ito et al. | 702/189 |
| 7,373,256 | B2 * | 5/2008 | Nicholson et al. | 702/19 |
| 7,388,194 | B2 * | 6/2008 | Schneider et al. | 250/288 |
| 7,473,892 | B2 * | 1/2009 | Sano et al. | 250/281 |
| 7,493,225 | B2 * | 2/2009 | Wang et al. | 702/85 |
| 7,529,629 | B2 * | 5/2009 | Wang | 702/22 |
| 7,577,538 | B2 * | 8/2009 | Wang | 702/85 |
| 7,645,984 | B2 * | 1/2010 | Gorenstein et al. | 250/281 |
| 7,667,195 | B2 * | 2/2010 | Vestal | 250/287 |
| 7,668,658 | B2 * | 2/2010 | Koster et al. | 702/19 |
| 2009/0325311 | A1 * | 12/2009 | Lecerf et al. | 436/501 |

OTHER PUBLICATIONS

Ito et al., “Matrix effect and correction by standard addition in quantitative liquid chromatographic-mass spectrometric analysis of diarrhetic shellfish poisoning toxins”, J. Chromatography A 943, 39, 2001.

Bonfiglio et al., “The effects of sample preparation methods on the variability of the electrospray ionization response for model drug compounds”, Rapid Communications in Mass Spectrometry, 13(12), 1175, 1999.

* cited by examiner

FIG. 4

| Compound | Concentration (ppb) | Conventional method 1 | | Conventional method 2 | | This method 1 | |
|---|---|---|---|---|---|---|---|
| | | Calculated concentration (ppb) | Error(%) | Calculated concentration (ppb) | Error(%) | Calculated concentration (ppb) | Error(%) |
| A | 125 | 72 | -42 | 129 | +3.3 | 117 | −6.1 |
| B | 83 | 50 | -40 | 89 | +7.3 | 70 | −16 |
| D | 416 | 27 | -93 | 48 | −88 | 344 | −17 |
| E | 416 | 28 | -93 | 51 | −88 | 490 | +18 |

ANALYTICAL SYSTEM AND METHOD UTILIZING THE DEPENDENCE OF SIGNAL INTENSITY ON MATRIX COMPONENT CONCENTRATION

CLAIM OF PRIORITY

The present application claims priority from Japanese application JP 2007-230903 filed on Sep. 6, 2007, the content of which is hereby incorporated by reference into this application.

BACKGROUND OF THE INVENTION

1. Field of the Invention

The present invention relates to an analytical instrument for mass analysis and a method using the same.

2. Description of the Related Art

A mass spectrometer is generally used for quantitative measurement, and a method described in "Xu X et al., Rapid Communications in Mass Spectrometry, 17,832, 2003" (hereinafter referred to as "Non-patent Document 1") is best known as a method for quantitative determination. In this method, a standard sample (or a target compound) of known concentration is previously introduced into the mass spectrometer to obtain the correlation (also termed a calibration curve) between concentration and signal intensity. Then, in this method, a target sample is introduced to determine its concentration. However, there is an inherent problem in the mass spectrometer. That is, when ionization takes place, the accuracy of quantitative determination is seriously affected because the signal intensity (or sensitivity) for the sample concentration varies greatly, depending on the influence of impurity components present in the sample (this phenomenon is termed matrix effects), or depending on the day-to-day conditions of the mass spectrometer.

A quantitative determination method given below is used in order to solve this problem.

U.S. Pat. No. 6,580,067 (hereinafter referred to as "Patent Document 1") discloses a method including the process of adding, as an internal standard, a different similar compound. It is considered to be preferable to add, to a target sample, a compound having a chemical property similar to that of the target sample, and also forming ions having a different m/z value from that of the target sample. As a suitable material to be added, used is a material resulting from replacement of at least one element (e.g., carbon or hydrogen) of a target compound by an isotope thereof. In this instance, sensitivity changes in the addition compound are assumed to be substantially the same as sensitivity changes in the target compound, thereby making it possible to calibrate the sensitivity changes caused by the matrix effects or the conditions of the mass spectrometer.

Described in "Ito S et al., J. Chromatography A 943, 39, 2001" (hereinafter referred to as "Non-patent Document 2") is a method including two measurements, which are made on a target sample with a target compound itself of known concentration added thereto, and on a target sample without the target compound added thereto (namely, standard addition method). This method enables calibrating the sensitivity changes caused by the matrix effects or the conditions of the mass spectrometer, because this method is capable of estimating the sensitivity of the target compound from a difference between the signal intensity of a target internal standard sample and the signal intensity of an added sample.

"Bonfiglio R et al., Rapid Communications in Mass Spectrometry, 13(12), 1175, 1999" (hereinafter referred to as "Non-patent Document 3") gives a description as to a validation method for judging whether or not there is a necessity to calibrate the sensitivity changes caused by the matrix effects or the conditions of the mass spectrometer. Although the methods described in Patent Document 1 and Non-patent Document 2 are effective approaches for calibrating the sensitivity changes caused by the matrix effects or the conditions of the mass spectrometer, the methods lead to a rise in a total cost of measurement, because the methods requires its stable isotope and needs a complicated measurement means for adding a known quantity of a target compound. Thus, generally used is a method that includes the process of: making a separation between matrix components and the target compound, using a pretreatment means such as solid phase extraction or liquid chromatography, prior to the introduction of the target compound into the mass spectrometer; and then introducing the target compound into the mass spectrometer. Incidentally, this method includes the process of: introducing a known quantity of similar compound into the pretreated components; and then monitoring the sensitivity. Here, this method is used to ensure that the separation is sufficient for the sensitivity to be equivalent to the sensitivity observed at the time of formation of the calibration curve. If the sensitivity of an addition compound is affected by the matrix components, a pretreatment process can be repeatedly improved for eventual development of a pretreatment measurement method such as does not affect the sensitivity. This method eliminates the need to add a reference standard for each target component, because of using the previously generated calibration curve for quantitative determination.

SUMMARY OF THE INVENTION

Recently, multi-component measurement has become increasingly important for mass analysis. The methods described in Patent Document 1 and Non-patent Document 2 must include substantially the same number of reference standards as multiple target components for multi-component quantitative determination. The method disclosed in Patent Document 1, in particular, requires the stable isotope of the target compound. However, there is a problem that the stable isotope generally is difficult to obtain, or expensive even if available. This method also has a problem that, if the target compound is chemically unstable, the stable isotope thereof is likewise unstable and is hence difficult to store. Additionally, the method described in Non-patent Document 2 has a problem that the cost of measurement increases, because measurement operation becomes complicated due to additional measurement operations for fractionating an original sample and for measuring an internal standard sample.

In addition, in Non-patent Document 3 or the like, there is a problem that measurement throughput decreases. Specifically, when the pretreatment method is employed to reduce the influence of matrix components, the method generally becomes complicated and takes a long time to perform, and thus, measurement throughput decreases.

An object of the present invention is to provide a mass spectrometer capable of multi-component measurement without reducing the measurement throughput and also without having to add a multi-component reference standard.

According to the present invention, there is provided an analytical instrument including: an ionization means for ionizing a mixture having a specific compound added to a target sample; a means for performing mass analysis on resulting ions; and a data processor that determines the concentration of a target compound contained in the target sample, wherein the data processor includes a database that stores dependence of signal intensity on the concentration of a specific matrix component for each of the target compound and the addition compound, and the data processor calculates, by using the database, the concentration of the target compound from a signal derived from the target compound and a signal derived from the addition compound, each signal obtained by the mass analysis means. In addition, the analytical instrument includes: a means for introducing the target sample; a means for introducing the addition compound; and a separating means for separating the introduced target sample, wherein the mixture is introduced into the ionization means.

Additionally, the analytical instrument of the present invention is characterized in that a mixture having a specific ionization-assisting chemical material added to the target sample is spotted on a sample plate, and the spotted sample is ionized by the ionization means.

In addition, according to the present invention, there is provided an analysis method for determining the concentration of a target compound contained in a target sample, including the steps of: ionizing a mixture a specific compound added to the target sample, by an ionization unit; and making measurements on resulting ions, by a mass analyzer, wherein a data processor uses a database that stores dependence of signal intensity on the concentration of a specific matrix component for each of the target compound and the addition compound, and the data processor calculates, by using the database, the concentration of the target compound from a signal derived from the target compound and a signal derived from the addition compound, measured by the mass analyzer. For tandem mass spectrometry, the data processor uses the m/z values of the resulting ions obtained from the mixture, the m/z values of the dissociated ions, and information on the ion intensities of the ions.

Additionally, according to the present invention, there is provided a calibration method for sensitivity changes in a mass spectrometer, including the steps of: introducing a compound of known concentration into an ionization unit; and measuring ion intensity derived from the ionized compound, by a mass analyzer, wherein, by using a database that stores dependence of signal intensity on the concentration of a matrix component for the compound, a data processor performs a comparison with the sensitivity of the compound observed when the concentration of the matrix component is 0. The data processor performs calibration of the database, using the result of measurement by the mass analyzer, based on the result of the comparison.

The present invention achieves a mass spectrometer capable of multi-component measurement without reducing the measurement throughput and also without having to add a multi-component reference standard.

BRIEF DESCRIPTION OF THE DRAWINGS

FIG. 4 is a table explaining the effect of the present invention.

DETAILED DESCRIPTION OF THE PREFERRED EMBODIMENTS

First Embodiment

Figure 1:
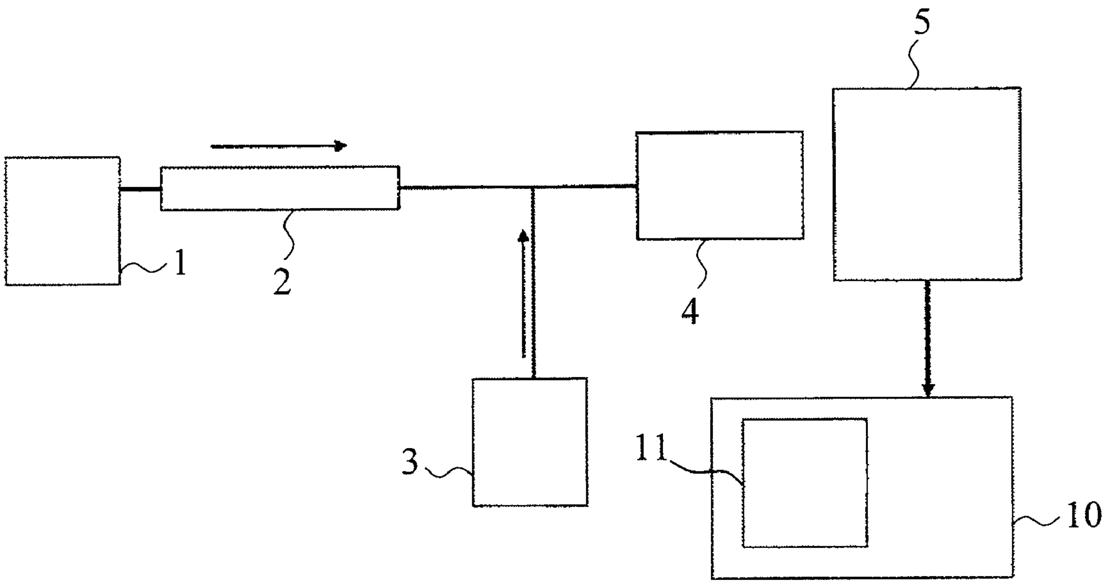
FIG. 1 is a block diagram showing a first embodiment of the present invention.

Description will be given below with regard to an embodiment of multi-component analysis of a solution sample according to the present invention. FIG. 1 is a block diagram showing the configuration of a measuring instrument in which a method of the present invention is implemented. A pumping means 1 such as a pump for liquid chromatography dispenses a target sample into a separating means 2. The separating means 2 formed of a normal phase chromatography column, a reverse phase chromatography column, an ion-exchange chromatography column, a size exclusion chromatography column, or the like subjects the target sample to time-based separation and elution and feeds it to the following stage. A pumping means 3 adds a solution containing one to several types of compound of known concentration to the separated solution. A compound whose database is created in advance to store data on sensitivity changes caused by matrix effects is used as an addition compound. A mixed solution of an eluate and an addition compound solution is dispensed into an ionization unit 4 of a mass spectrometer. The ionization unit 4 formed of an electrospray ionization source, an atmospheric pressure chemical ionization source, an atmospheric pressure photo-ionization source, an atmospheric pressure matrix-assisted laser desorption ionization source, a matrix-assisted laser desorption ionization source, a chemical ionization source, an electron impact ionization source, or the like subjects a target compound and an addition compound to ionization, using different ionization methods. Since varying matrix effects occur on the ionization efficiencies of the ionization methods, a database 11 on the influence of sensitivity on matrix concentration according to the ionization method for use is created in advance for all target compounds and addition compounds. A mass analyzer 5 makes measurements on resulting ions obtained by the ionization unit 4 to measure the m/z and ion intensity values of the ions, and transmits the measured values to a data processor 10. Incidentally, the mass analyzer 5 also uses a method called "tandem mass spectrometry" using not only the m/z values of the resulting ions from the compound but also information on the m/z values of resulting ions obtained after dissociation of the ions. With this method, the mass analyzer 5 measures combinations of the m/z values before and after dissociation of the ions and also measures the ion intensities of the decomposed ions, and thus transmits the measured values to the data processor 10.

The data processor 10 prerecords, in the database, signal intensity (i.e., sensitivity) and matrix concentration dependence of the sensitivity, which are observed when the m/z values of the resulting ions from the target compound and the addition compound (or the m/z values of the ions produced after the dissociation) and the known concentrations of the compounds are fed into the ionization unit 4. The data processor 10 can identify the type of component by the m/z value (or a combination of m/z values).

Figure 2:
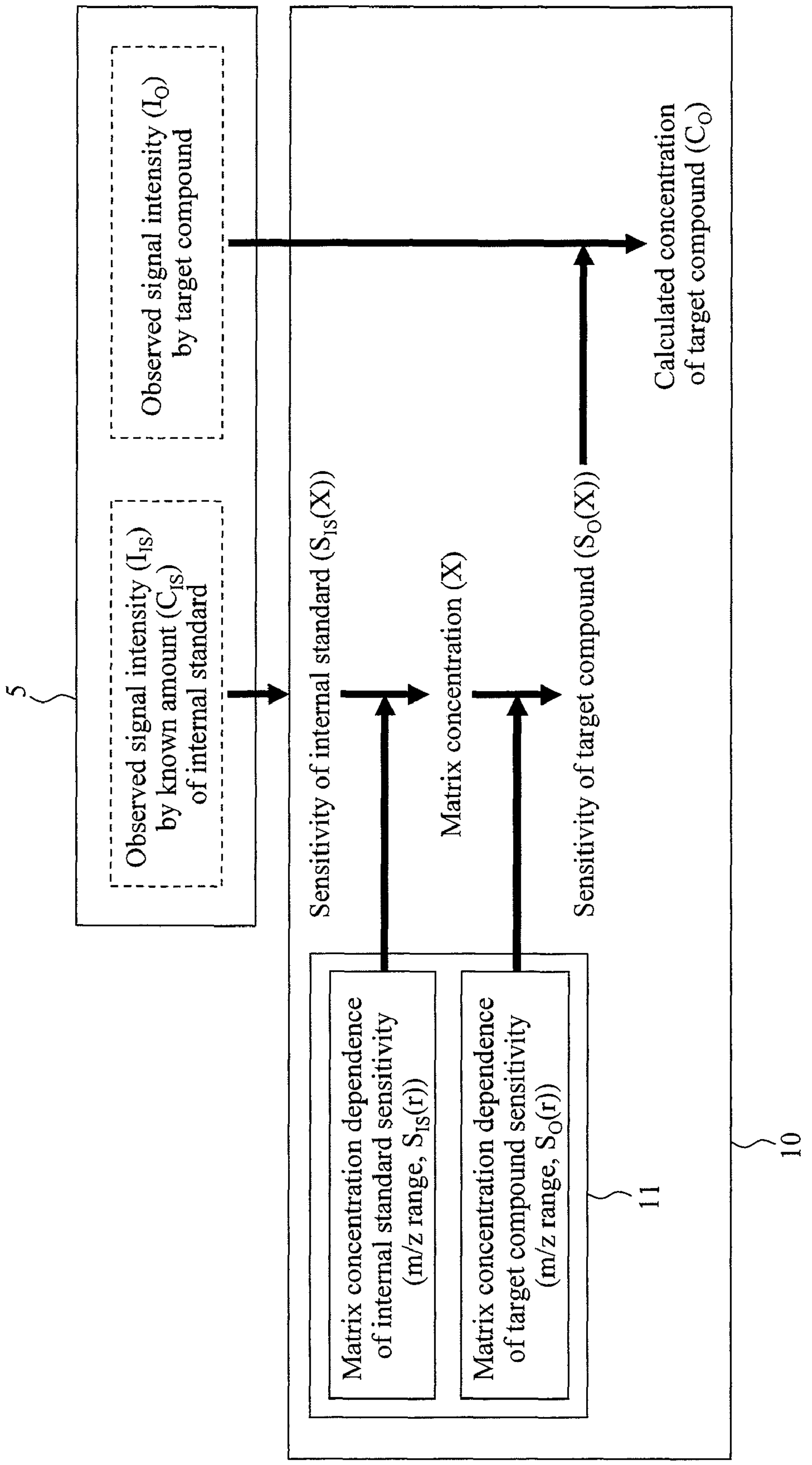
FIG. 2 is a sequence chart showing a measurement sequence according to the first embodiment.

Description will be given with reference to FIG. 2 with regard to a method for quantitative determination on the basis of the information stored in the database. Sensitivity functions $S_O(r)$ and $S_{IS}(r)$ of the target compound and an internal standard, taking matrix concentration r (e.g., a mixture ratio of a plasma extracted solution) as a variable, are prestored in the database 11. The sensitivity $S_{IS}(X)$ of the internal standard is expressed by Equation (1):

$$S_{IS}(X) = \frac{I_{IS}}{C_{IS}} \quad (1)$$

where $I_O$ and $I_{IS}$ represent the signal intensities of the target compound and the internal standard transmitted from the mass analyzer 5, respectively; X, matrix concentration (unknown) contained in the target sample; $C_{IS}$, the concentration of the internal standard; and $C_O$, the calculated concentration of the target compound. The matrix concentration X can be calculated from the result derived from Equation (1) and the function $S_{IS}(r)$ prestored in the database. Then, the sensitivity $S_O(X)$ of the target compound is determined from the matrix concentration X and the function $S_O(r)$ prestored in the database. The concentration $C_O$ of the target compound is determined by Equation (2) from the sensitivity $S_O(X)$ and the signal intensity $I_O$ of the target compound transmitted from the mass analyzer 5.

$$C_O = \frac{I_O}{S_O(X)} \quad (2)$$

Description has been given above with regard to a sequence for calibrating the matrix effects according to the present invention.

Figure 3:
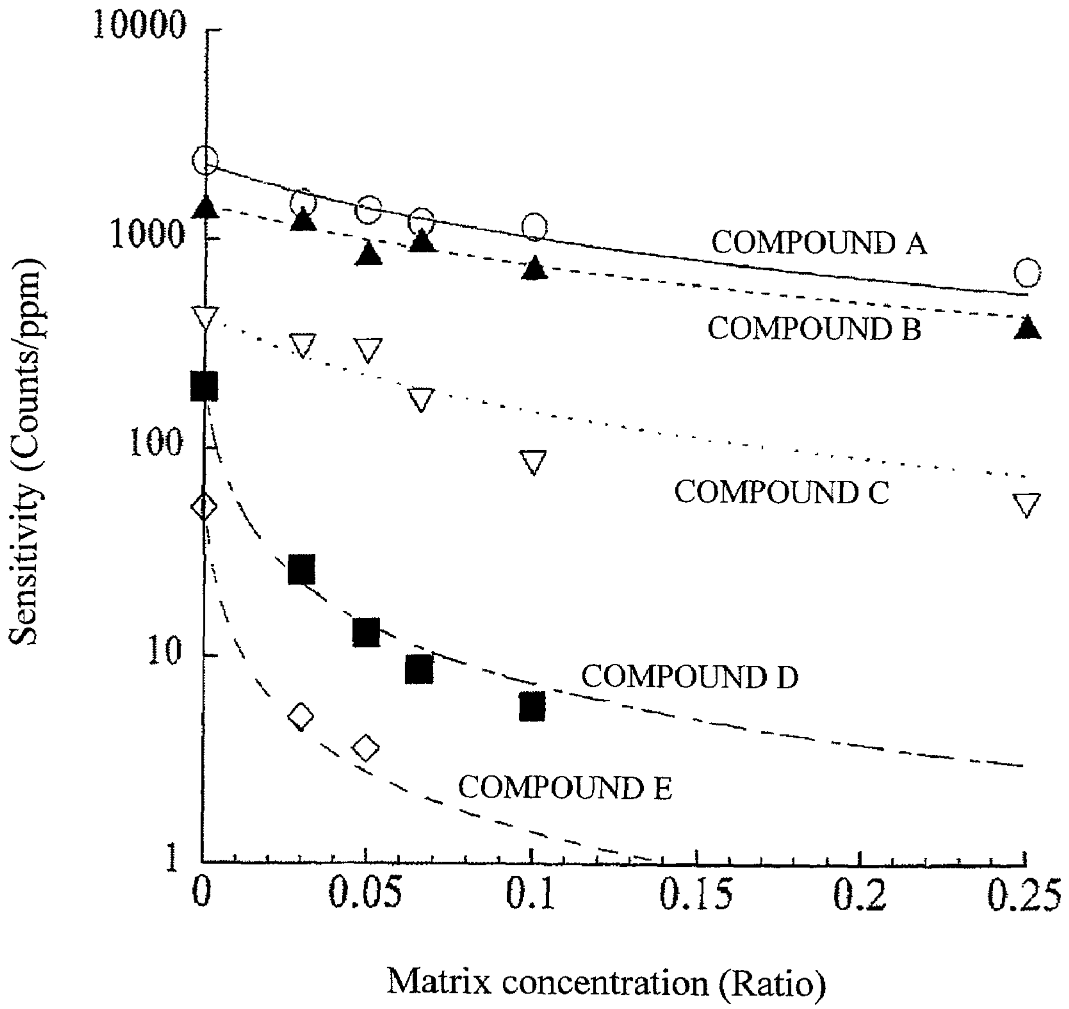
FIG. 3 is a plot explaining the effect of the present invention.

Description will now be given with regard to a specific method for generating the sensitivity functions $S_O(r)$ and $S_{IS}(r)$ of the target compound and the internal standard, taking the matrix concentration r as the variable. FIG. 3 is a plot showing the sensitivities of compounds A to E of varying matrix concentrations. The ionization unit 4 is used in positive ionization mode of electrospray ionization, and a time-of-flight mass spectrometer is used as the mass analyzer 5. In FIG. 3, the vertical axis indicates the sensitivity calculated by dividing molecular ion intensity derived from the compounds A, B, C, D and E by the concentration, and the horizontal axis indicates the matrix concentration. Although several points are merely plotted in FIG. 3, points can be finely plotted to obtain the functions $S_O(r)$ and $S_{IS}(r)$ with higher accuracy. However, experimental data may be approximated by Equation (3) in order to save time and labor required to obtain data on many points.

$$S(X) = \frac{A}{1 + BX} \quad (3)$$

In Equation (3), A and B represent fitting constants. Plots approximated by Equation (3) are also shown in FIG. 3.

The generation of the sensitivity functions $S_O(r)$ and $S_{IS}(r)$ of the target compound and the internal standard must take place prior to the start of quantitative determination. If plural devices are used for the same purpose, the devices may be configured so that each device performs the above operation or all devices share the database obtained by a specific device.

Besides this, higher accuracy can be achieved by selecting typical matrix components (e.g., urine samples or cell samples) and extracted solutions thereof from target samples determined by actual measurement, and defining them as matrix concentration. On the other hand, a compound that is easy to obtain salt such as $NH_4Cl$ or NaCl may be selected. This compound has the merit of making it possible to provide the matrix for creation of the database with ease and with high reproducibility, although producing the problem of causing deterioration in the accuracy.

The results of actual measurement will be given below with reference to the database shown in FIG. 3. The compound C was dispensed as the internal standard by the pumping means 3 to thereby calibrate the compounds A, B, D and E in the target sample. A matrix (of unknown concentration) of a blood extracted solution was mixed to preform a solution such that the concentration of the compound A is 125 ppb, the concentration of the compound B is 83 ppb, the concentration of the compound D is 416 ppb, and the concentration of the compound E is 416 ppb. The internal standard compound C at a concentration of 250 ppb was added to the solution. For explanation of the effect of the method of the present invention, two types of conventional quantitative determination methods were used for comparisons. The conventional method 1 is the method described in Non-patent Document 1, which includes the process of previously generating the calibration curve, and making a quantitative determination on the basis of the sensitivity obtained from the calibration curve. With the conventional method 1, considerable errors were observed in calculated concentrations, since this method makes a quantitative determination, assuming that matrix effects are absent. Then, the method disclosed in Patent Document 1 was used as the conventional method 2. Calculations of compound concentrations were performed, assuming that the compounds other than the compound C also undergo the same sensitivity changes as the sensitivity changes in the compound C that acts as the internal standard. With the conventional method 2, good calculated concentrations were obtained as for the compounds A and B that are similar to the compound C in the matrix concentration dependence of the sensitivity function, but considerable errors were observed in calculated concentrations as for the compounds D and E that are different from the compound C in the matrix concentration dependence. On the other hand, description will be given with regard to the results obtained by use of the method of the present invention. First, the sensitivity of the compound C can be calculated from the ion intensity and the concentration derived from the compound C. The matrix concentration (i.e., the mixture ratio) was calculated at 0.045 from the calculated sensitivity and the database of the compound C (i.e., the data of FIG. 3 approximated by Equation (3)). The results of quantitative determination shown in FIG. 4 were obtained from the calculated matrix concentration and the sensitivity functions in the databases of the compounds A, B, D and E. With the method of the present invention, the calculated concentrations coincided with one another with an accuracy of measurement within 20% for all compounds, as distinct from the conventional methods 1 and 2.

The conventional method (described in Non-patent Document 1) causes a rise in cost because it is necessary to add about the same number of compounds as the target compounds. However, in the present embodiment, quantitative determination of a multi-component target compound can be performed, in principle, with one type of internal standard. This determination is achieved by preobtaining the matrix concentration dependences of the sensitivities of the target compound and the internal standard, and thus by storing the obtained data in the database. On the other hand, plural internal standards may be used to improve the accuracy of measurement. For example, an improvement in the accuracy of measurement can be achieved by selecting one each of compounds with high and low matrix effects as the internal standards; grouping compounds that are similar in matrix dependence to the selected internal standards; and calibrating the matrix concentration with the internal standard that is close in property.

Additionally, although the above embodiment uses liquid chromatography for separation, other liquid separation methods may be used, or the present invention is applicable in precisely the same manner even without the use of the separating means. Omission of the separating means enables a reduction in measuring time and a simplification of measurement, thus enabling a reduction in instrument cost. However, the omission of the separating means has the demerit of increasing the influence of the matrix effects. In addition, although in the above embodiment the mixing of the solution containing the internal standard takes place after the separating means 2, the mixing of the solution may take place before the separating means. This has the merit of enabling the monitoring of the permeability efficiency of the separating means 2, based on the ion intensity of the internal standard. However, the use of a liquid chromatography column for the separating means 2 has the demerit of speeding up deterioration in the column.

Although description has been given above with regard to a calibration method for the sensitivity changes caused by the matrix effects, factors responsible for the sensitivity changes in the mass spectrometer include deterioration in the permeability of the mass analyzer 5, besides the matrix effects. Description will be given below with regard to a calibration method for sensitivity changes caused by the mass analyzer. The mass spectrometer shown in FIG. 1 can be also used for calibration of the mass analyzer. In this instance, the pumping of the target sample is stopped so that the matrix components are not dispensed to the ionization unit 4. At this time, the internal standard alone of known concentration is dispensed into the ionization unit 4. The mass analyzer 5 monitors the ion intensity derived from the internal standard ionized by the ionization unit 4, and transmits the result to the data processor 10. The data processor 10 stores, in the database 11, the sensitivity of the internal standard observed when the matrix concentration is 0. Thus, the data processor 10 performs a comparison between the transmitted data and the stored data. If the transmitted data varies greatly from the database (by two to three times or more), a cleaning or maintenance alarm is given to a user. If the transmitted data varies a bit from the database (by two to three times or less), the sensitivity prestored in the database is calibrated by Equations (4) and (5).

$$S'_{IS}(X) = \frac{S'_{IS}}{S_{IS}(0)} S_{IS}(X) \tag{4}$$

$$S'_{O}(X) = \frac{S'_{IS}}{S_{IS}(0)} S_{O}(X) \tag{5}$$

In Equations (4) and (5), $S'_{IS}$ represents the signal intensity determined by actual measurement mentioned above, and $S'_{IS}(X)$ and $S'_{O}(X)$ represent the calibrated sensitivity database. The above method enables calibration with considerably high accuracy, because the sensitivity changes caused by the instrument have little dependence on chemical properties of the component, as distinct from the sensitivity changes caused by the matrix effects. On the other hand, it is effective to select, as the internal standards, multiple compounds that form ions of different m/z values, because the sensitivity changes caused by the instrument can possibly have dependence on the m/z value.

Second Embodiment

Figure 5:
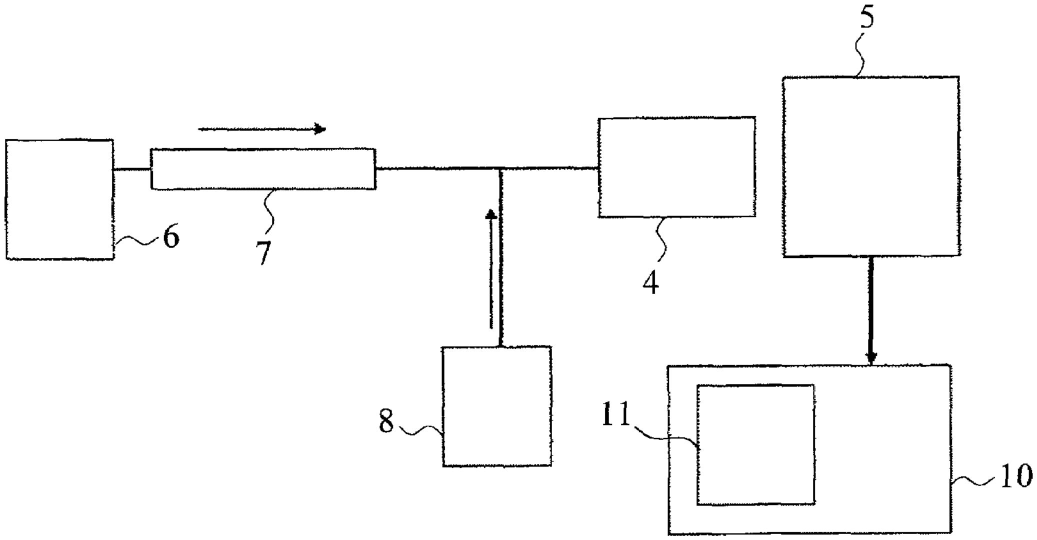
FIG. 5 is a block diagram showing a second embodiment of the present invention.

Description will be given below with regard to an embodiment of multi-component analysis of a gas sample according to the present invention. FIG. 5 shows the configuration of an instrument. A pumping means 6 such as a dispensing pump dispenses a target gas into a separating means 7. The separating means 7 formed of a capillary column or the like subjects the target gas to time-based separation and elution, and feeds it to the following stage. A pumping means 8 adds a gas containing at least one type of compound to the separated gas. A compound whose database is created in advance to store data on sensitivity changes caused by matrix effects is used as an addition compound. A mixed gas of a separated gas and an addition compound gas is dispensed into an ionization unit 4 of a mass spectrometer. The ionization unit 4 formed of an atmospheric pressure chemical ionization source, an atmospheric pressure photo-ionization source, a chemical ionization source, an electron impact ionization source, or the like subjects a target compound and an addition compound to ionization, using different ionization methods. Since varying matrix effects occur on the ionization efficiencies of the ionization methods, a database 11 on the influence of sensitivity on matrix concentration according to the ionization method for use is created in advance for all target compounds and addition compounds. The above calibration method is precisely the same as the first embodiment. Additionally, as in the case of the first embodiment, the second embodiment uses chromatography for separation, but the present invention is applicable in precisely the same manner even without the use of the separating means. Omission of the separating means enables a reduction in measuring time and a simplification of measurement, thus enabling a reduction in instrument cost. However, the omission of the separating means has the demerit of increasing the influence of the matrix effects. In addition, although in the second embodiment the mixing of the gas containing the internal standard takes place after the separating means 7, the mixing of the gas may take place before the separating means. This has the merit of enabling the monitoring of the permeability efficiency of the separating means 7, based on the ion intensity of the internal standard. However, the use of a gas chromatography column has the demerit of speeding up deterioration in the column.

Third Embodiment

Figure 6:
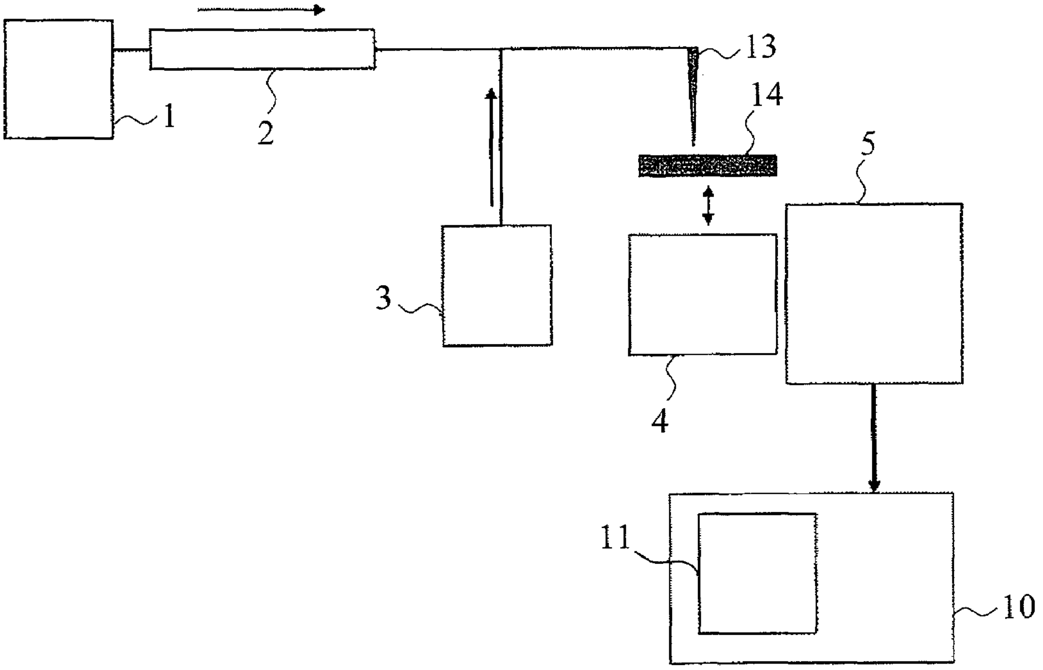
FIG. 6 is a block diagram showing a third embodiment of the present invention.

The present invention may be applied to not only an on-line measuring instrument such as the first or second embodiment but also an off-line measuring instrument. FIG. 6 shows the configuration of an instrument. Methods for the pumping and separation of a target sample and the mixing of an addition solution are substantially the same as the first embodiment. If the third embodiment uses matrix-assisted laser ionization or the like for ionization and requires a chemical material assisting ionization (e.g., CHCA (α-cyano-4-hydroxycinnamic acid), sinapic acid (3,5-dimethoxy-4-hydroxycinnamic acid), etc.), the chemical material is added in advance to the addition solution, and a mixed sample of them is spotted on a sample plate 14 by a spot means 13. After the sample solution has been dried, the spotted plate is introduced into an ionization unit 4. The ionization unit 4 performs various ionizations such as desorption electrospray ionization (DESI), atmospheric pressure matrix-assisted laser desorption ionization, matrix-assisted laser desorption ionization, secondary ionization, and fast atom bombardment ionization (FAB). Since varying matrix effects occur on the ionization efficiencies of the ionization methods, a database 11 on the influence of sensitivity on matrix concentration according to the ionization method for use is created in advance for all target compounds and addition compounds. The following calibration method is precisely the same as the first embodiment.

Although description has been given with regard to specific variations of different calibration methods with reference to the above embodiments, the following is common to these embodiments: they include the means for introducing the internal standard into the ionization unit, and include prestoring the sensitivity to the matrix mixture ratio of the target compound and the internal standard in the database; calculating the matrix mixture ratio from the ion intensity derived from the internal standard; calculating the sensitivity of the target compound from the calculated mixture ratio; and making a quantitative determination of the target compound, based on the calculated sensitivity and the ion intensity derived from the target compound. This enables multi-component measurement without reducing measurement throughput and also without having to add a multi-component reference standard.

What is claimed is:

1. An analytical instrument, comprising:

an ionization means for ionizing a mixture of a target sample and a specific compound added thereto;

a means for performing mass analysis on resulting ions; and a data processor that determines the concentration of a target compound contained in the target sample, wherein the data processor includes a database that stores dependence of signal intensity on the concentration of a specific matrix component for each of the target compound and the addition compound, and the data processor calculates, by using the database, the concentration of the target compound from a signal derived from the target compound and a signal derived from the addition compound, each signal obtained by the mass analysis means.

2. The mass spectrometer according to claim 1, wherein the database stores the dependence of signal intensity according to each ionization method.

3. The analytical instrument according to claim 1, further comprising:

a means for introducing the target sample;

a means for introducing the addition compound; and a separating means for separating the introduced target sample, wherein the mixture is introduced into the ionization means.

4. The analytical instrument according to claim 3, wherein the separating means is provided between the means for introducing the target sample and the means for introducing the addition compound.

5. The analytical instrument according to claim 3, wherein the means for introducing the addition compound is provided between the means for introducing the target sample and the separating means.

6. The analytical instrument according to claim 1, wherein the addition compound is a plurality of compounds of different dependences of the signal intensity on the concentration of the matrix component, stored in the database.

7. The analytical instrument according to claim 1, wherein the matrix component is blood or a component extracted from the blood.

8. The analytical instrument according to claim 1, wherein the matrix component is salt.

9. The analytical instrument according to claim 1, wherein the target sample is a liquid.

10. The analytical instrument according to claim 1, wherein the target sample is a gas.

11. The analytical instrument according to claim 1, wherein a mixture having a specific ionization-assisting chemical material added to the target sample is spotted on a sample plate, and the spotted sample is ionized by the ionization means.

12. An analysis method for determining the concentration of a target compound contained in a target sample, comprising the steps of:

ionizing, by an ionization unit, a mixture of a target sample and a specific compound added thereto;

making measurements on resulting ions, by a mass analyzer; and calculating, by a data processor using a database, the concentration of the target compound from a signal derived from the target compound and a signal derived form the addition compound, which signals are measured by the mass analyzer, the database storing dependence of signal intensity on the concentration of a specific matrix component for each of the target compound and the addition compound.

13. The analysis method according to claim 12, wherein a plurality of compounds of known concentrations and of different matrix effects stored in the database are added to the target sample.

14. The analysis method according to claim 12, wherein the mass analyzer performs tandem mass spectrometry so as to obtain an m/z value of the resulting ions from the mixture, an m/z value of ions produced by dissociation of the resulting ions, and information on the ion intensities of the resulting ions and the produced ions, and the data processor performs data processing using the database and the obtained m/z values and the information from the mass analyzer.

15. A calibration method for sensitivity changes in a mass spectrometer, comprising the steps of:

introducing a compound of known concentration into an ionization unit;

measuring ion intensity derived from the ionized compound, by a mass analyzer; and performing, by a data processor using a database, a comparison with the sensitivity of the compound observed when the concentration of the matrix component is 0, the database storing dependence of signal intensity on the concentration of a matrix component for the compound.

16. The calibration method according to claim 15, wherein the data processor performs calibration of the database, by using the result of measurement by the mass analyzer, on the basis of the result of the comparison.

17. The calibration method according to claim 15, wherein the compound of known concentration is a plurality of compounds of different m/z values.

* * * * *